United States Patent Office 3,734,791
Patented May 22, 1973

3,734,791
SURFACTANT-CONTAINING SOLDERING FLUXES
Richard M. Poliak, Johnson City, N.Y., assignor to International Business Machines Corporation, Armonk, N.Y.
No Drawing. Filed Oct. 23, 1970, Ser. No. 83,613
Int. Cl. C23c 1/12
U.S. Cl. 148—23                                12 Claims

ABSTRACT OF THE DISCLOSURE

A water soluble soldering flux substantially free of halide ions comprising organic solvents and a cationic fluorocarbon as an activator/surfactant/corrosion inhibitor. A typical formulation comprises ethylene glycol, glycerine, isopropyl alcohol, and the cationic fluorocarbon surfactant/activator.

BACKGROUND OF THE INVENTION

Field of the invention

The present invention relates to water soluble soldering fluxes containing fluorinated surfactants.

Description of the prior art

Water solubles fluxes are known to the prior art. However, all known available water soluble fluxes are corrosive. In the environment of microelectronics, corrosion from residual flux can ruin costly electronic devices.

The organic water-soluble fluxes known to the prior art contain halides and the like as a matter of course. For instance, the prior art organic fluxes are quite often based upon amines and halogen-containing acids which react to yield a halogenated salt. If the prior art flux is one which contains free halogen elements, these are converted to hydro-acids and the corresponding halide ions by hydroylsis at the soldering temperature. Hydro-acids can further react with organic materials present in the flux to free halide ions, for instance, organic acids, such as citric and tartaric acids, which are often added to such fluxes to suppress the formation of solder icicles at the tips of leads and solder bridging onto adjacent parts. Components such as those described remain in the flux residue after soldering. If the flux residue is not completely removed, this will lead to corrosion of the parts soldered.

The purpose of a flux in soldering is, of course, to remove oxide surface films on metal and molten solder and to prevent reoxidation of the surfaces during soldering. Metal oxides can be dissolved in a variety of acids, which is basically how the many of the above-described fluxes function. However, this dissolution, a main purpose of using a flux, will always produce metal salts, if fluxes as above are used, which are difficult to remove quantitatively, and which eventually cause corrosion. In this respect amine-hydrochlorides hardly differ from free hydrochloric acid.

In contradistinction, the present invention permits removal of oxide films by predominately non-ionic reactions, leaving non-ionic products and thereby eliminating the corrosion mechanism.

Another problem encountered with many of the prior art water soluble fluxes is that while they are removable subsequent to soldering, removal is very difficult. For instance, to remove prior art flux residues, it is typically necessary to utilize a hot water rinse in combination with neutralization, or a two percent hydrochloric acid solution in combination with a hot water rinse and neutralization, or to use many specialized water-based detergents. This is due to the fact that prior art fluxes have two types of residue, i.e., a solvent-soluble rosin residue and a water-soluble activator residue. Thus, at least two rinses or cleanings are always required. Needless to say, if it would be possible to obviate the need for such complex procedures, which quite often use materials which can be deleterious to soldered parts, it would be extremely beneficial to the art.

Basically, the ease of removing a flux after soldering with any specific solvent is greatly influenced by the fact that it is the chemical nature of the residue after soldering which will control the ease or difficulty of removal, and not the initial nature of the solvent flux per se. Typically, organic ingredients present in the flux will decompose, carbonize or polymerize during different phases of the soldering procedure. This is true even if all components of the flux are, prior to soldering, water soluble.

The prior art has, to a certain extent, appreciated the above faults of commercially available fluxes. Especially in the area of microelectronics, soldering requires a flux which will yield an entirely non-corrosive and non-removable residue. Accordingly, soldering in the microelectronic environment, such as printed circuit soldering, is generally restricted to the activated rosin fluxes, since pure rosin is inadequate to meet the requirements of the soldering process per se. In fact, in the microelectronic environment, the organic fluxes which contain corrosive salts of acids, hydrazine and other organic bases must be completely excluded from soldering processes.

For instance, in U.S. Pat. 3,220,892 a soldering flux is disclosed which is described as non-corrosive. However, this flux contains at least one hydrazine salt, which would lead to corrosion.

In U.S. Pat. 3,223,561 a flux for use with soft solders is described which also contains a hydrazine salt, specifically, hydrazine acetate, with a substantial excess of free acetic acid. Obviously, corrosion cannot be avoided.

In U.S. Pat. 3,199,190 a solder flux is described for use in the formation of automotive radiator cores which comprise the reaction product of an organic amine with hydroxy acetic acid and a wetting agent. The wetting agent in this instance is used only as a surfactant, and lends no corrosion-resistance to the flux, that is, it does not serve as a corrosion inhibitor.

All of the above fluxes are typical of the activated fluxes of the prior art, that is, they contain activators such as acids, bases or salts. The purpose of the activator is to remove surface oxides on the parts which are mated during soldering. Needless to say, any of the activators used in the prior art can potentially serve as a source of corrosion if incomplete removal of the flux residue is encountered.

SUMMARY OF THE INVENTION

The present invention provides a novel, water soluble soldering flux which, though of general applicability, is especially useful in the field of electronics.

In broadest terms, the water soluble flux comprises organic solvents, and a dissolved, solid fluorochemical activator. The fluorochemical activator also serves as a corrosion inhibitor, as well as a surfactant or wetting agent.

The solid cationic fluorocarbon activator/surfactant/activator (hereinafter the terms will often be used interchangeably) of the present invention basically consists of a non-cyclic fluorocarbon chain or "tail," which is both hydrophobic and oleophilic, and solubilizing group which lends a cationic character to the fluorocarbon chain.

In the fluorocarbon chain of the present invention, it is necessary that the hydrogens on the carbon structure be replaced by fluorine to such a degree that the fluorocarbon chain or hydrophobic portion of the liquid surfactant be essentially a fluorocarbon. This does not imply complete hydrogen replacement in all instances, though such will, for ease of commercial availability, generally be the case.

The cationic fluorocarbon activator of the present invention will always contain the recurring unit ($CF_2$), and can generally be represented by the formula:

$$YCF_2(CF_2)_p-X$$

wherein X is a solubilizing group, as defined below, Y is a moiety required to complete the fluorocarbon chain such as H or F, and $p$ is a positive integer.

The solubilizing group is a group which will have a cationic character and impart such a character to the fluorocarbon "tail."

The solubility of the cationic fluorocarbon activator can be controlled by varying the nature of the solubilizing functional group X. However X must always provide a cationic solubilizing character to the fluorocarbon surfactant. Non-ionic, anionic and amphoteric groups have been tested and found to be inoperative in the water soluble flux of the present invention.

The flux of this invention generally comprises from 0.06% to 0.40% of a cationic fluorocarbon surfactant/activator(s), the balance being compatible organic solvents.

In the most preferred form, the water soluble soldering flux of this invention comprises 99.69 to 99.81% of organic solvents, e.g., glycerine, ethylene glycol, isopropyl alcohol, and from 0.19 to 0.31% of a cationic fluorocarbon surfactant/activator of the general formula $$FCF_2(CF_2)_p-X$$

It is a first object of this invention to provide a water soluble soldering flux containing a cationic fluorocarbon activator/surfactant/corrosion inhibitor.

It is another object of the present invention to provide a water soluble soldering flux which is not corrosive, that is, which is substantially completely lacking free halogens, acids, bases and the like.

It is a further object of the present invention to provide a water soluble soldering flux which is easily and completely removed, subsequent to soldering, by washing with water.

It is yet another object of the present invention to provide a water soluble soldering flux which illustrates excellent thermal stability.

These and other objects of the present invention will become clear upon reading of the following material.

DETAILED DESCRIPTION OF THE PREFERRED EMBODIMENTS

As heretofore indicated, a need has existed in electronics industry for surfactant-activated, water-soluble soldering fluxes which are not corrosive. The primary function of any activator is to remove tarnish or oxides from the surface of both the solder and the metallic surfaces which are to be joined by soldering. If acids, salts, bases or the like are present in the activator, corrosive residues result.

While many commercial products are claimed by the vendors to be non-corrosive, careful laboratory analysis of all available water-soluble soldering fluxes indicates the presence of halides such as chlorides, e.g., amine hydrochloride, and the presence of acids, bases, etc. While some prior art fluxes can be rendered practically non-corrosive by heating the entire fluxed area to a high temperature, thereby leaving no unheated flux on the work piece (to attempt to obtain complete decomposition), such a practice is completely impractical in the electronics industry where high temperature and prolonged heating to insure decomposition of flux residue would damage components as well as degrade materials used in printed circuits and the like. It is a further peculiarity of the microelectronics industry that soldering flux which is present on insulating materials does not decompose to the extent that flux heated on metallic areas will decompose.

In short, while small amounts of these materials may not lead to immediate harm, with the passage of time materials such as halogens, etc., will lead to corrosion of soldered parts and the like, thereby resulting in device failure.

While a halogen is present in the cationic fluorochemical activator/surfactant used in this invention, the chemical and thermal stability of these compounds, especially at solder temperatures, is such that a flux in accordance with this invention shows no free halides or acid in the flux residue after soldering. Lab methods used to investigate for acids or halides include X-ray scattering, IR spectrophotometry, mass spectrographic analysis and volumetric wet quantitative analysis. It is theorized that the nature of the covalent bonding present in fluorocarbons is such that the compound remains intact and chemically inert when heated at soldering temperatures.

In order to provide a water soluble flux with increased reliability of solder joints, i.e., a solder joint free from corrosion, and to provide a water soluble flux which can be removed merely by water, the inventor has discovered that in a novel combination, a fluorocarbon surfactant/activator can be used to overcome all of the above problems of the prior art fluxes.

Specifically, a flux comprising a cationic fluorocarbon activator and organic solvents overcomes the problems of the prior art recited above and provides a flux with no corrosive components, which can be easily removed by washing with deionized water.

Examples of such a flux are set out below. Percents are by weight based on the total flux.

EXAMPLE 1

| | | |
|---|---|---|
| Glycerine | g. (68 cc.) | 85 |
| Ethylene glycol | g. (13 cc.) | 15 |
| Isopropyl alcohol | g. (39 cc.) | 31 |
| Cationic fluorocarbon activator | g. | 0.30 |

EXAMPLE 2

| | | |
|---|---|---|
| Glycerine | g. (68 cc.) | 85 |
| Ethyl Cellosolve | g. (16 cc.) | 15 |
| Isopropyl alcohol | g. (39 cc.) | 31 |
| Cationic fluorocarbon activator | g. | 0.30 |

EXAMPLE 3

| | | |
|---|---|---|
| Glycerine | cc. | 68 |
| Isopropyl alcohol | cc. | 39 |
| Ethylene glycol | cc. | 19 |
| Ethyl Cellosolve | cc. | 22 |
| Cationic fluorocarbon activator | g. | 0.30 |

EXAMPLE 4

| | | |
|---|---|---|
| Ethylene glycol | cc. | 40 |
| Ethyl Cellosolve | cc. | 40 |
| Isopropyl alcohol | cc. | 20 |
| Cationic fluorocarbon activator | g. | 0.30 |

EXAMPLE 5

| | | |
|---|---|---|
| Ethylene glycol | cc. | 50 |
| Ethyl Cellosolve | cc. | 50 |
| Cationic fluorocarbon activator | g. | 0.30 |

From its broad aspect, the present water soluble flux preferably composes 0.06 to 0.40% cationic fluorocarbon activator, the balance being water soluble organic solvents. Up to 65% of the solvents can preferably be glycerine, though glycerine need not be present at all.

In a most preferred form, the flux comprises 20 to 65% glycerine, 10 to 14% ethylene glycol, 21 to 25% isopropyl alcohol and 0.19 to 0.31% of a cationic fluorocarbon surfactant. If the minimum amounts of the above solvents are used, the balance can be any organic solvent as defined in a later portion of the specification.

The cationic fluorocarbon surfactant is generally not required in amounts more than 0.40% (based on the organic solvents) because greater amounts do not improve the flux, either in its ability to clean metal surfaces or in its ability to show improved surface tension. However, no harm (though no substantial benefit) would be encountered in using up to 4% or higher of the cationic fluorocarbon, one merely wastes the fluorocarbon.

Glycerine is present in the preferred embodiment of the water-soluble soldering flux of the present invention because of its interaction with the cationic fluorocarbon surfactant. It is believed that the glycerine releases OH (hydroxyl) groups which aid in the cleaning and soldering of metal surfaces. Due to the high boiling point of glycerine, approximately 290° C., glycerine permits the flux of the present invention to be utilized in soldering at higher temperatures than normally feasible, that is, at temperatures over 500° F., and yet still provides chemically stable, easily removed residues after soldering. These residues can be removed easily with deionized water.

However, it must be emphasized that fluxing activity can be obtained using the cationic fluorocarbon activator of this invention with other organic solvents in the absence of the gylcerine component. The wetting and spreading properties of the flux can be controlled by blending organic solvents such as alcohols, Cellosolves, glycols, etc. to obtain the desired balance of properties to meet the requisite conditions of specific gravity, surface tension and viscosity required for a particular fluxing operation.

Thus, while the cationic fluorocarbon surfactant is critical to the functioning of the present invention, glycerine is a preferred solvent which can be omitted with an appropriate blending of the remaining solvent constituents. Of course, it will be apparent that is such a blending is attempted, it will be necessary to know the flux application to enable an appropriate flux vehicle to be formulated.

It is preferred to balance the flux composition with respect to the organic solvents utilized, that is, the glycerine, alcohols, Cellosolves, and glycols. The exact balancing will depend upon the flux application method, device or parts which are to be soldered, the solder alloy used and the thermal cycle of the soldering itself.

More specifically, in balancing a flux, it is necessary to realize that the soldering process usually includes the successive operations of fluxing, preheating, soldering, cooking, cleaning and drying.

Once a flux application method has been chosen the approximate flux solvents can be determined. One does this by determining the thermal cycle by recording actual product temperatures during processing as the device is soldered. By determining the product temperature at various process operations a balanced flux solvent system can be obtained, i.e., one which permits the flux to perform its cleaning function without undue sputtering etc., and which will permit solvents to be volatilized from the flux at an appropriate portion of the thermal cycle.

The general technique of "balancing" a flux is known to the art. A specific application of balancing would be as follows: The solder used was 63/37 SnPb alloy heated to a temperature of 510±10° F. The product consisted of populated small circuit cards. The percentage of solvents was therefore limited to this product application. Flux application was at about 80° F., which a preheat from 140°, a wave soldering at 380 to about 450° F., and then cooling to about 80° F. A balanced flux solvent composition was 44% glycerine, 23% ethylene glycol and the balance $C_1$ to $C_3$ alcohols. The alcohols volatilized first, then the ethylene glycol and then the glycerine. Thus, sufficient solvent was present all throughout the required period but solvent removal was also accomplished. Obviously, for other temperatures a different balance would be used for most preferred results.

A flux composition which is properly formulated will not sputter during the soldering process, and this is quite important as sputtering will cause tiny bits of solder to be splashed or cast onto insulating areas where no solder is to be present.

The preferred organic solvents for use in the present invention are the $C_1$ to $C_3$ primary alcohols and isomeric forms thereof, ethylene, di-, tri- and polyethylene glycols having a molecular weight of 400 or less, most preferably 62 to 400, ethyl, propyl and butyl Cellosolve and glycerine. These may be used singly or in any combination. The most preferred solvents are isopropyl alcohol, ethylene glycol, ethyl Cellosolve and glycerine. The Cellosolves are actually, for instance, ethyl Cellosolve, 2-ethoxyethanol.

However, the present invention is not to be limited to the preferred solvents, i.e., the $C_1$ to $C_3$ alcohols, the $C_2$ to $C_3$ alkylene group glycols or the $C_2$ to $C_4$ alkyl group Cellosolves. On the contrary, other solvents, for instance tert-butyl alcohol, can be used so long as they meet the following criteria, in addition to those requirements of any prior art flux heretofore used:

(1) if alcohols are used, they must volatilize before the other solvent components;

(2) the solvents must dissolve the cationic fluorocarbon activator substantially completely, i.e., while it is most preferred to have complete dissolution, up to about 25% or higher of undissolved fluorocarbon can remain and permit soldering through such is non-preferred; solvents of marginal usage in this respect are the $C_4$–$C_5$ alcohols;

(3) the solvent must be completely water soluble.

While the non-preferred solvent systems can be used alone, far superior results are achieved if they are used in combination with the preferred solvents above, in amounts less than 50% of the total solvents. Materials which must be avoided in the flux of the present invention are, of course, those materials which could lead to corrosion.

One skilled in the art will appreciate that wetting agents and solvents are found in many fluxes. However, the use of the cationic fluorochemical activator of the present invention is nowhere shown in the prior art nor are the particular advantages obtained upon the combination of materials which provide the novel water-soluble soldering flux of the present invention shown.

It is now appropriate to turn to the cationic fluorocarbon surfactant/activator/corrosion inhibitor which provides the unique and novel improvement of the present invention. It will be appreciated that a cationic fluorocarbon activator is necessary and critical to the present invention, and it is believed that those materials which are acceptable will be apparent from the description provided below.

The cationic fluorocarbon activator used is a surfactant material, that it, it will provide lowered surface tension and greater wetting to the solder flux, and greatly reduces the amount of cleaning required. This is a substantial subsidiary advantage obtained upon the use of a flourochemical activator of the present invention.

While the reason for this is not completely understood, it is theorized that the molecules in the cationic fluorocarbon compound become oriented along interfacial boundaries to achieve surface activity effects at very low concentrations. This orientation is not a property of surfactants in general, and thus the cationic fluorocarbon activator/surfactatants of this invention cannot be analogized to other surfactants, as this surface activity effect is a very specific property of the cationic fluorocarbons.

The fluorochemical activator, which serves as a surfactant should not be confused with common state of the art wetting agents which are present in various soldering fluxes. Surfactants utilized by the prior art have typically been alcohols or organic solvents present in significant quantities to promote wetting. Many hydrocarbon surfactants used in the prior art were found to be far inferior at low concentrations when used to replace the cationic fluorocarbon surfactant of the present invention. The prior art surfactants also suffered from the fault that their thermal and chemical stability were far below that illustrated by the cationic fluorocarbon surfactant of this invention.

It will be understood by those skilled in the art that the term "activator" implies that portion of the flux which serves as a cleaning or fluxing agent and removes surface oxides from the areas to be soldered. In the present invention, the cationic fluorocarbon surfactant serves this purpose. It must be emphasized that anionic and non-ionic surfactants, that is, where the solubilizing group was anionic or nonionic, were unexpectedly found to decrease fluxing activity.

The corrosion inhibiting function of the fluorocarbon activator is, of course, of particular value in the electronic industry, where corrosion must be stopped. In the following discussion the terms "fluorocarbon" and "fluorochemical" will be used interchangeably.

A fluorinated or fluorochemical activator, as the term is used in the present invention, is an organic material that contains the element fluorine and a solubilizing group in its structure. The term "solubilizing group" is used to denote any moiety which will provide the surfactant with water solubility, and cationic characteristics.

The following material describes the solid cationic fluorocarbon activators useful in the present invention in greater detail.

As a general rule, the fluorocarbon should be used in solvents which permit complete dissolution thereof. Only .06 to 0.40% fluorocarbon is required. However, as indicated, greater amounts are not generally harmful. Undissolved fluorocarbon should comprise only 25% of the total fluorocarbon used.

Cationic fluorocarbons as used in this invention can be defined as compounds of carbon and fluorine with or without hydrogen, i.e., analogs or hydrocarbons in which all or nearly all the hydrogen has been replaced by fluorine. More specifically, the presence of two or more fluorine atoms on a carbon atom impart increased stability and inertness to that compound. The cationic fluorocarbons are characterized by extreme chemical inertness, do not burn, and are thermally stable to 500° F. or more.

The fluorocarbons used in this invention are known to the art, and no novelty is claimed for the fluorocarbons per se. The fluorocarbons used in this invention can be prepared by processes available to the prior art, for instance:

(a) by the electrolysis of solutions in hydrogen fluoride (Simons Process) described in U.S. Pat. 2,519,983;

(b) by the replacement of chlorine or bromine by fluorine, i.e., with hydrogen fluoride in the presence of a catalyst such as antimony triphosphate or pentafluoride;

(c) by the addition of hydrogen fluoride to olefines or acetylene;

(d) by the reaction of alkanephosphoric acid chloride with a diamine or polyamine to produce at least one free amino group in the product, for instance, as described in U.S. Pats. 2,655,533 and 2,648,706 Lewis et al.;

(e) by the permanganate oxidation of a polyfluoroalkanol which is the reaction product of methanol and a fully halogenated polyfluoroalkanol having the formula $H(CX_2CX_2)_nCH_2OH$, where X is a halogen of atomic weight below 40, at least half of the X's in each $CX_2CX_2$ group are fluorine and $n$ is an integer from 3 to 10, inclusive. For instance, see U.S. Pat. 2,559,629 Berry.

Literature on the preparation of fluorocarbons is quite extensive. One typical method which utilizes a reaction tube and insures good yields is described below.

Flourine is diluted with nitrogen, then reacted slowly with hydrocarbon vapors within meshes of a copper screen plated with silver. Temperatures in the reaction tube range from 140–325° C.

$AgF_2$ is the active agent for fluorinating (replacing hydrogen) the organic material, allowing elemental fluorine to renew an active coating on the metallic surface. By this process n-heptane, for example, is reacted to yield 62% of $C_7F_{16}$.

Cationic fluorochemical activators as used herein have the unique property of being surface active in organic liquids as well as aqueous solutions. They represent the most stable and surface active of all known surfactants. These surfactants have the ability to absorb to many surfaces from solution and provide corrosion and stain resistance.

The use level for cationic fluorochemical surfactants is very low, and they can thus provide surfactant properties without adverse side effects normally associated with the use levels of ordinary surfactants.

The cationic fluorocarbon surfactants of the present invention contain the recurring unit ($CF_2$), and can generally be represented by the formula:

$$YCF_2(CF_2)_p-X$$

wherein X is a solubilizing group, as defined below, Y is a moiety required to complete the fluorocarbon chain such as H or F, and $p$ is a positive integer.

The solubilizing portion consists of any group which will have a cationic character. The term "cationic character" refers to the positive charge carried by the solubilizing group. The cationic fluorocarbon activator used in this invention can thus be viewed as a molecule, one end of which is a solubilizing functional group, while the other end consists of a fluorocarbon group containing a minimum of four carbon atoms.

Any cationic fluorocarbon surfactant which meets the above qualifications can be used with varying degrees of success in the present invention. The following material deals with representative and preferred materials useful in the present invention which have been found to yield superior results.

Generally, representative preferred cationic fluorocarbon activators comprise quaternary ammonium fluorocarbon compounds, ammonium fluorocarboxylates and perfluorcarboxylic acids.

Turning first to the preferred quaternary ammonium cationic fluorocarbon activators of this invention, these can broadly be represented by the formula:

where $n$ is preferably from 6 to 9, $q$ is 2 or 3, and $r$ is 0 to 2. X represents any halide. Two specific examples of materials within the above class are:

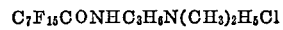

and

The $R_f$ or fluorocarbon portion may be chosen to give the desired properties for effective surface treatment, i.e., the desired surface tension of the flux to optimize solder wetting properties.

When $n<5$, the activator may prove unsatisfactory due to high volatility or instability. In the case of $n>9$, the $R_f$ increase using an $R_H$ comparable to those above, would make solubility the determining factor. That is, $n>9$ is acceptable, but the fluorocarbon must still be soluble in the flux components. Similarly, the acceptability of compounds where $n<5$ would depend upon the volatility or instability acceptable to the user.

Similar changes in the $R_H$ portion of the molecule would affect chemical, as well as physical, properties.

Tailor-made activators, from their surfactant capability, can thus be obtained through $R_f/R_H$ variations to gain the desired property effects.

The length of the quaternary ammonium cationic agent provides the desired water solubility with the anion having an insignificant effect on properties. The formula for the cationic fluorocarbon activator used in the flux preparation of the examples is within the class specifically:

$$F(CF_2)_7CONHC_3H_6N(C_2H_5)_2CH_3I$$

A second group of preferred cationic fluorocarbon surfactants includes the C-9 and C-11 ammonium fluorocarboxylates having the general formula:

$$H(CF_2)_nCOONH_4$$

where $n=8$ or 10.

Chemically, these compounds are ammonium salts of highly fluorinated alkanoic acids.

It shall be understood that compatible mixtures of cationic fluorocarbon activators can be used in accordance with the present invention, and usage is not limited to single activator systems.

A third group of preferred cationic fluorocarbon activators useful in the present invention are the perfluorocarboxylic acids in which the carbon chain of the hydrophobic group is completely fluorinated except for one terminal hydrogen atom. These can be represented by the formula:

$$HCF_2(CF_2)_SCOOH$$

where S preferably is 5 to 8. The salts thereof, such as the metal salts, may also be used.

The use of a cationic fluorocarbon activator offers a unique combination of properties which cannot be duplicated by any other materials and which, in short, provides the art with advantages heretofore unexpected in the use of non-activated rosin fluxes, e.g., fluorine, a highly corrosive atom, will not be freed from the surfactant during soldering which one might be led to expect. Accordingly, while halide groups (fluorine, chlorine, bromine, iodine) will be present, these will always be in the form of a compound, and not as free ions. There are no organic acids present or sulfonated long chain aliphatic alcohols as in the prior art.

Having thus described the present invention in a broad manner, the following specific example is offered to provide a specific use for the present water soluble soldering flux, i.e., a liquid organic solvent flux which, unlike the so-called "water soluble" fluxes of the prior art, is removable simply by washing, after soldering, with deionized water.

EXAMPLE 1

A water soluble soldering flux in accordance with the present invention having the following composition was formulated.

|  | G. |
| --- | --- |
| Glycerine | 85 |
| Polyethylene glycol | 15 |
| Isopropyl alcohol | 31 |
| Cationic fluorocarbon activator | 0.30 |

The polyethylene glycol used had a molecular weight of 400, and the fluorochemical activator was FC-134, available from the 3M Corporation. FC-134 has the chemical composition $F(CF_2)_7CONHC_3H_6N(C_2H_5)CHI$.

After forming the above soldering flux, the flux was used in the following soldering process. However, it will be appreciated by one skilled in the art that the present water soluble soldering flux can be used in combination with any known state of the art soldering material to join together any materials which can be joined by soldering. Further, and also completely non-limiting, the present soldering flux can be used to join a vast number of metals, and would be useful even when used to solder difficultly wet alloys such as nickel plate and beryllium copper, though with some difficulty.

The flux of the present invention can be applied by any conventional process such as by brushing, dipping, spraying or solder wear.

In the present example, a flat cable assembly having silver wires was soldered to thin-lead printed circuit parts using a reflow technique. The flux of the present invention was brushed onto the circuit parts and soldering was conducted at a temperature of 500–550° F.

No sputtering of solder was noted, and following soldering the residue was easily removed by washing with deionized water.

The primary advantages of the solder flux of the present invention over prior art fluxes can thus be described as:

(1) no corrosive residue remains after soldering;
(2) excellent heat transfer is provided during soldering;
(3) no sputtering is noted during soldering;
(4) uniform solder flow occurs;
(5) only deionized water is required for residue removal, i.e., no extensive cleaning procedures are necessary, such as the use of neutralizers or organic solvents;
(6) no ultrasonic agitation is required during cleaning which would be detrimental to sensitive electronic parts; and
(7) good solder joints are promoted without corrosion, the prior art requiring highly corrosive fluxes to produce good solder joints.

While the invention has been particularly shown and described with reference to preferred embodiments thereof, it will be understood by those skilled in the art that various changes in form and details may be made therein without departing from the spirit and scope of the invention.

What is claimed is:

1. A water soluble soldering flux substantially lacking free halides comprising:
   at least one water soluble organic solvent in which a cationic fluorocarbon is soluble, and
   at least one cationic fluorocarbon activator/surfactant/corrosion inhibitor present in an amount of from 0.06 to 0.40% by weight.

2. The flux of claim 1 wherein said at least one organic solvent comprises 20 to 65% by weight glycerine.

3. The flux of claim 2 wherein said organic solvent comprises by weight 20 to 65% glycerine, 10 to 14% ethylene glycol, and 21 to 25% isopropyl alcohol.

4. The flux of claim 3 wherein from .19 to .31% by weight of said at least one cationic fluorocarbon is present.

5. The flux of claim 1 wherein said at least one organic solvent is selected from the group consisting of alcohols having from one to three carbon atoms, ethylene glycol, diethylene glycol, triethylene glycol, polyethylene glycol having a molecular weight of from 62 to 400, 2-ethoxy ethanol, 2-ethoxy propanol, 2-ethoxy butanol and glycerine.

6. The flux of claim 1 wherein said fluorocarbon is selected from the group consisting of polyfluoroquaternary ammonium surfactants, ammonium fluorocarboxylate surfactants, polyfluorocarboxylic acid surfactants and mixtures thereof.

7. The flux of claim 6 wherein said surfactant is a polyfluoroquaternary ammonium surfactant of the formula $$C_nF_{2+n}CONHC_3H_6N(CH_3)_qC_rH_{2r+1}X$$

where $n$ is 6 to 9, $q$ is 2 or 3, $r$ is 0 to 2 and X is a halide.

8. The flux of claim 6 wherein said surfactant is an ammonium fluorocarboxylate surfactant of the formula $$H(CF_2)_nCOONH_4$$

where $n$ is 8 or 10.

9. The flux of claim 6 wherein said surfactant is a polyfluorocarboxylic acid surfactant or salt thereof of the formula $$HCF_2(CF_2)_SCOOM$$

where S is 5 to 8 and M is hydrogen or a group required to form a salt thereof.

10. The flux of claim 6 wherein said surfactant is $$C_7F_{15}CONHC_3H_6(CH_3)_3I$$

11. The flux of claim 6 wherein said surfactant is $$C_7F_{15}CONHC_3H_6N(CH_3)_2C_2H_5Cl$$

12. The flux of claim 6 wherein said surfactant $$F(CF_2)_7CONHC_3H_6N(C_2H_5)_2CH_3I$$

References Cited

UNITED STATES PATENTS 3,357,093  12/1967  Bauman _____ 148—23

OTHER REFERENCES

Carpenter et al.: IBM Technical Disclosure Bulletin, vol. 12, No. 8, January 1970.

Carpenter et al.: IBM Technical Disclosure Bulletin, vol. 11, No. 7, December 1968.

Poliak: IBM Technical Disclosure Bulletin, vol. 13, No. 3, August 1970.

GEORGE T. OZAKI, Primary Examiner

U.S. Cl. X.R.

148—25; 29—495